(No Model.)

H. B. ROBINSON.
AUTOMATICALLY OPENING DIE FOR CUTTING SCREW THREADS.

No. 569,769. Patented Oct. 20, 1896.

Witnesses:
Ed. E. Claussen
Eva L. Shelton

Inventor.
Howard B. Robinson

UNITED STATES PATENT OFFICE.

HOWARD B. ROBINSON, OF HARTFORD, CONNECTICUT.

AUTOMATICALLY-OPENING DIE FOR CUTTING SCREW-THREADS.

SPECIFICATION forming part of Letters Patent No. 569,769, dated October 20, 1896.

Application filed August 17, 1896. Serial No. 602,964. (No model.)

*To all whom it may concern:*

Be it known that I, HOWARD B. ROBINSON, a citizen of the United States, residing at Hartford, in the county of Hartford and State of Connecticut, have invented certain new and useful Improvements in Automatically-Opening Dies for Cutting Screw-Threads, of which the following is a full, clear, and exact specification.

This invention relates to a novel and simple construction of automatically-opening dies for cutting threads on pipe, rod, or bolts whereby the length of the threaded part of such pipe, rod, or bolts is accurately gaged or measured and adapted for use in a turret-machine or any other longitudinal reciprocating carriage, and also to provide a die which renders its manipulation handier, its action more effective, its adjustment easier, and having the chasers so arranged and constructed that the chips are washed away unobstructed into the receiving-receptacle, thus preventing the die from being clogged up and interfering with its free and accurate action.

Figure 1:
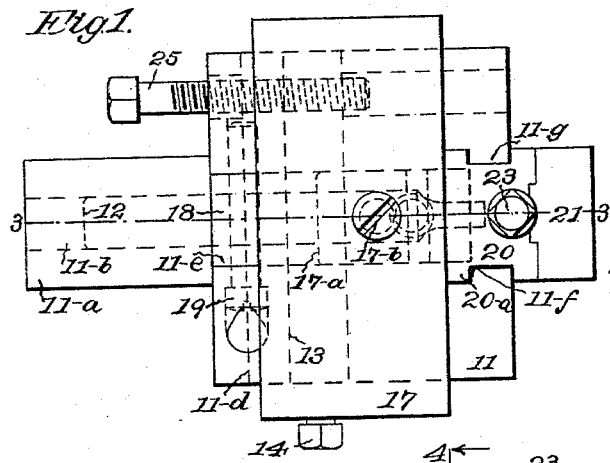
Figure 2:
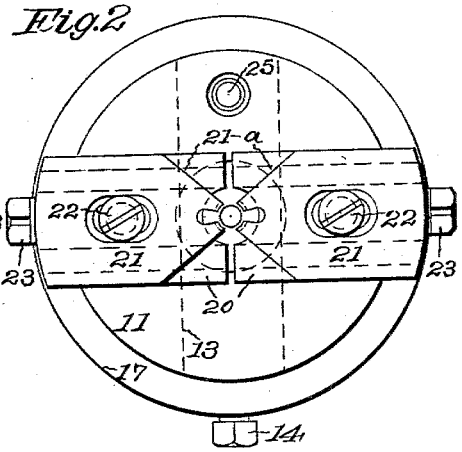
Figure 3:
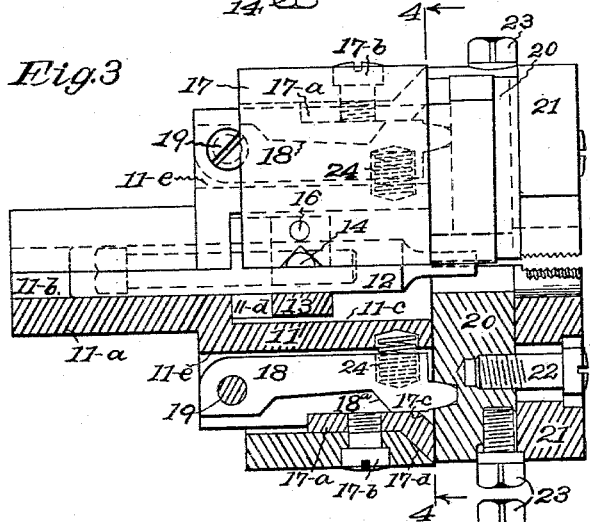
Figure 4:
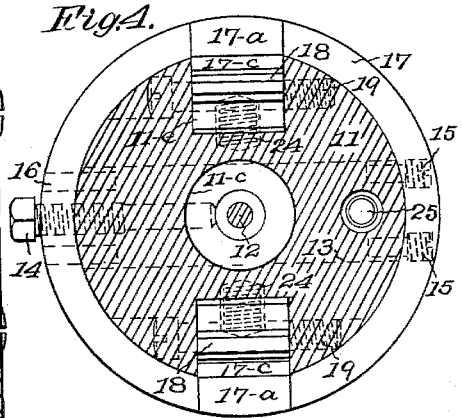
Figure 5:
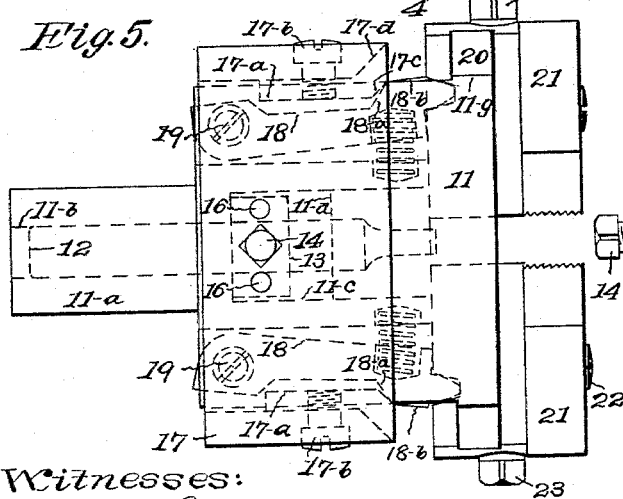
Figure 6:
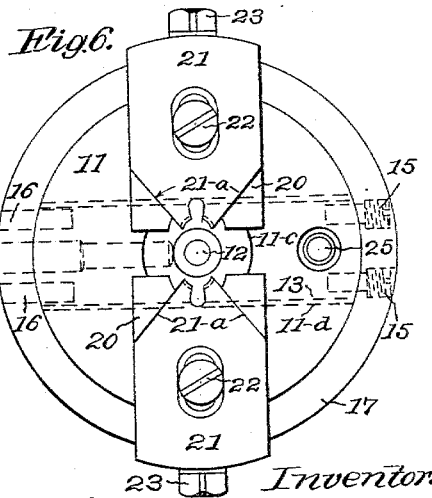

In the accompanying drawings, forming a part of this specification, Figure 1 represents an external plan view of my improved automatically-opening die of preferred construction, the chasers being shown in the normally-closed position. Fig. 2 is a front view of what is shown in Fig. 1. Fig. 3 is a side view of Fig. 1, partly in section, the same being taken on line 3 3 of that figure. Fig. 4 is a sectional front view on line 4 4 in the direction of the arrows of Fig. 3. Fig. 5 represents an external side view showing the chasers in an opened position. Fig. 6 is a front view of what is shown in Fig. 5.

In the following specification, of which the accompanying drawings form a part thereof, similar letters or numerals of reference designate like or equivalent parts wherever found throughout the several views, and in which—

The numeral 11 designates the body of the die, which is provided with the stem $11^a$, which is supported in a holder designed to be rigidly affixed against rotation to a turret of a screw-machine or any other carriage capable of a longitudinal reciprocating movement, such as are commonly used in pipe-threaders, bolt-threaders, and various other machines of this class. The stem $11^a$ is provided with the concentrical cylindrical opening $11^b$ and enlarges to the concentrical cylindrical opening $11^c$, as shown. The concentrical cylindrical opening $11^b$ is adapted to receive the gage-plug 12, which is adjustably fastened to the cross-head 13 by the set-screw 14. The cross-head is adapted to move longitudinally back and forth in the transverse opening $11^d$, which is in line with the concentrical cylindrical opening $11^c$ of the body and is fastened by the screws 15 and pins 16 to the annular collar 17, which is mounted on the exterior of the body.

The annular collar 17 is provided with two shoes $17^a$, fastened to the same by the screws $17^b$, which serve as a feather engaging in a spline $11^e$ of the body and prevent the annular collar from turning and also serve to operate the sectors to hold the same in substantially that position in which the chasers are in their normally-closed position. The said shoes are provided with the cam-faces $17^c$, and it is designed to have the same of such shape and form that when they engage with the said sectors it renders the action free and easy. The front part of the shoe, where it fits against the annular collar, is beveled off, as at $17^d$, for the purpose of gaining more metal, thus adding strength, and also to take the strain from the shoe when in engagement upon the sector.

The sectors 18 are pivotally mounted in diametrically opposite positions to the body by the pivot-screws 19, fitted into the splines $11^e$, and have the beveled cam-surfaces $18^a$ and the straight contact-surface $18^b$, as shown. The teeth or tooth of the sectors mesh into the die-holders 20. The front face of the body 11 is provided with sockets $11^f$ to receive the die-holders and are cut diametrically, extending from the concentrical cylindrical opening $11^b$ to the periphery, and these sockets $11^f$ are also provided with guides $11^g$ on their side walls to engage grooves in the die-holder.

The die-holders are constructed of a block to fit the sockets $11^f$, and the sides being provided with grooves $20^a$ to receive the guides $11^g$. To the die-holders 20 are securely fastened the chasers 21 in any of the well-known manners and as herein shown and described by the screws 22 and the adjusting-screw 23, and provided with the beveled sides $21^a$ to throw out the chips as they are cut from the rod.

The normally-closed or operative position of the die-holders and chasers is shown in Figs. 1, 2, 3, and 4, and in this position the shoes rest with their straight contact-surfaces upon the sectors against the pressure of the springs 24.

The parts being constructed and arranged as described, the operation of my opening die is as follows: The die being mounted on the turret of a screw-machine or any other longitudinal reciprocating carriage is, as I will assume, in the normally-closed or operative position, and as the turret, with the die-head, is advanced toward the bolt or rod end the chasers engage the same and cut the thread as the bolt or rod is rotated. The gage-plug, having been previously set at a certain point to give the required length of the threaded portion of said bolt or rod, will encounter the end of the advancing rod and forces the same rearward, carrying along therewith the cross-head, the annular collar, and the shoes, until the straight contact-surface of the sectors is brought back of the beveled edge of the shoes. When this point is reached, the springs 24 will press the sectors outward, carrying therewith the die-holders and chasers, and the bolt or rod end is disengaged therefrom and the carriage or turret is permitted to retract to its starting position, and in so doing the annular collar 17 or its correspondent, the set-screw 25, engages with a stationary stop on the frame of the machine and forces the collar forward, and thus the cam-surfaces 17$^c$ ride over the straight contact-surfaces of the sectors and force the same toward the center and the die is then in the normally-closed or operative position ready for the threading of the following blank.

25 is a set-screw tapped into the cross-head, against which a pin or any lug on the machine may abut to close the die from the open adjustment to the closed or operative position. It is obvious that more than two die-holders having chasers attached thereto can be arranged for, and therefore I do not confine myself to this particular construction herein shown.

It will be observed that the chasers are held in a position entirely beyond the body and the operating mechanisms, which give the chips as they are cut away a free unobstructed travel. Thus the die is never clogged up, the objectionable feature which is found in nearly every other opening die made and the source of an enormous amount of trouble and bad work.

It is obvious that changes can be made without departing from the spirit of my invention and I do not limit myself to the exact embodiment here shown.

Having thus described my invention, what I claim as new, and desire to secure by Letters Patent, is—

1. An automatically-opening die, adapted to be attached to a turret or other carriage, and comprising the body, the same having sockets extending radially across the face of the body, die-holders fitting into said sockets, chasers mounted to the face of said die-holders, sectors pivotally mounted in the body and engaging said die-holders, the longitudinal sliding annular collar capable of a limited longitudinal movement and provided with shoes having cam-surfaces and engaging the sectors, springs to act upon the sectors, the cross-head mounted to the annular collar, the gage-plug borne by the cross-head all substantially as described.

2. An automatically-opening die, adapted to be attached to a turret or other carriage, and comprising the body, the same having sockets extending radially across the face of the body, die-holders fitting into said sockets, chasers mounted to the face of said die-holders, sectors pivotally mounted in the body and engaging said die-holders, the annular collar movably mounted on the exterior of the body and carrying the cross-head, the gage-plug borne by the cross-head, all parts combined and operating to throw the die to open adjustment when the advancing threaded end encounters the gage-plug and carries the same rearward substantially as described.

3. An automatically-opening die, adapted to be attached to a turret or other carriage, and comprising the body, the same having sockets extending radially across the face of the body, die-holders fitting into said sockets, chasers mounted to the face of said die-holders, sectors pivotally mounted in the body and engaging said die-holders, the longitudinal sliding annular collar capable of a limited longitudinal movement and provided with shoes having cam-surfaces and engaging the sectors, and devices acting upon the sectors, the cross-head mounted to the annular collar through the transverse opening 11$^d$ in line with the central cylindrical opening 11$^c$ of the body, substantially as described.

4. An automatically-opening die, adapted to be attached to a turret or other carriage, and comprising the body, the same having sockets extending radially across the face of the body, die-holders fitting into said sockets, chasers mounted to the face of said die-holders, sectors pivotally mounted in the body and engaging said die-holders, the longitudinal sliding annular collar capable of a limited longitudinal movement and provided with shoes having cam-surfaces and engaging the sectors, the cross-head mounted to the annular collar, the gage-plug held in the adjustable position by set-screw 14 to vary the length of thread to be cut substantially as described.

HOWARD B. ROBINSON.

Witnesses:
EVA S. SHELTON,
ED. E. CLAUSSEN.